United States Patent
Nampelly et al.

(10) Patent No.: US 9,813,324 B2
(45) Date of Patent: Nov. 7, 2017

(54) DYNAMIC CONTROL OF ENDPOINT PROFILING

(71) Applicant: Cisco Technology, Inc., San Jose, CA (US)

(72) Inventors: Ramesh Nampelly, Sunnyvale, CA (US); Pok Sze Wong, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 213 days.

(21) Appl. No.: 14/734,511

(22) Filed: Jun. 9, 2015

(65) Prior Publication Data

US 2016/0366040 A1 Dec. 15, 2016

(51) Int. Cl.
| | |
|---|---|
| *G06F 15/16* | (2006.01) |
| *H04L 12/26* | (2006.01) |
| *H04L 29/06* | (2006.01) |
| *H04L 29/08* | (2006.01) |
| *H04L 12/24* | (2006.01) |
| *H04L 29/12* | (2006.01) |

(52) U.S. Cl.
CPC .......... *H04L 43/12* (2013.01); *H04L 41/0806* (2013.01); *H04L 43/50* (2013.01); *H04L 67/02* (2013.01); *H04L 67/42* (2013.01); *H04L 69/22* (2013.01); *H04L 61/6004* (2013.01); *H04L 61/6022* (2013.01)

(58) Field of Classification Search
CPC ............................ H04L 43/12; H04L 41/0806
USPC ........................................................ 709/203
See application file for complete search history.

(56) References Cited

U.S. PATENT DOCUMENTS

| | | | |
|---|---|---|---|
| 6,286,038 B1 * | 9/2001 | Reichmeyer | ........ H04L 41/0213 709/220 |
| 8,327,432 B2 | 12/2012 | Wong et al. | |
| 2003/0061339 A1 * | 3/2003 | Benfield | ............. H04L 41/0213 709/224 |
| 2006/0168205 A1 | 7/2006 | Barron et al. | |

(Continued)

OTHER PUBLICATIONS

"Configuring Auto SmartPort Macros", Catalyst 4500 Switch Software Configuration Guide, Chapter 17, OL-22170-01, 2010, 14 pages.

(Continued)

*Primary Examiner* — Duyen Doan (74) *Attorney, Agent, or Firm* — Edell, Shapiro & Finnan, LLC (57) ABSTRACT

A server is in communication with a network device that has network connectivity to an endpoint device. The server receives from the network device a packet that includes a Media Access Control (MAC) address of the endpoint device. A determination is made as to whether at least a portion of the MAC address matches stored information for MAC addresses of known endpoint devices. One or more attributes that carry further descriptive information of the endpoint device are extracted from the packet. It is determined based whether the endpoint device can be classified at a level of granularity according to a policy rule. If the endpoint device cannot be classified at the level of granularity, a probe function is dynamically selected based on the one or more attributes extracted from the packet and the MAC address to collect additional data about the endpoint device.

20 Claims, 6 Drawing Sheets

(56) References Cited

U.S. PATENT DOCUMENTS

| | | |
|---|---|---|
| 2009/0225670 A1 | 9/2009 | Leung et al. |
| 2012/0131211 A1* | 5/2012 | Schemitsch ....... G06F 17/30861 709/228 |
| 2013/0282886 A1* | 10/2013 | Taylor .................... H04L 41/12 709/223 |
| 2014/0181290 A1 | 6/2014 | Wong |
| 2015/0039513 A1 | 2/2015 | Adjaoute |

OTHER PUBLICATIONS

"Device Sensor", OL-26564-01, Jun. 26, 2012, Cisco Systems, Inc., 28 pages.

Yaw Tzu Lim, et al., "Dynamic Security Policy Learning", WISG '09, Nov. 13, 2009, ACM 978-1-60558-787-5/09/11, 10 pages.

"End point profiling doesn't work on Clear pass", Airheads Community, Aug. 6, 2013, http://community.arubanetworks.com/t5/AAA-NAC-Guest-Access-BYOD . . . , retrieved on Apr. 16, 2015, 3 pages.

* cited by examiner

DYNAMIC CONTROL OF ENDPOINT PROFILING

TECHNICAL FIELD

The present disclosure relates to determining a profile for an endpoint on a network.

BACKGROUND

A goal of endpoint profiling is to provide visibility as to the type and/or identity of the endpoint device. Determining a name or description of the endpoint device is useful. Another more important goal of endpoint profiling is to provide insight as to what software may be expected on the device and its security risk profile. This involves classifying and tagging the device as, for example, a printer, phone, television, laptop, tablet, or personal computer for purposes of applying a security policy based on a need to know and/or a policy. For example, a data should flow one-way for a printer.

A Media Access Control (MAC) address, and in particular the Organizationally Unique Identifier (OUI) portion of a MAC address, is a useful starting point for device profiling. The OUI portion provides a good indication of the device type if the manufacturer is specialized in making only certain devices. However, more often the OUI is too general. If a manufacturer makes personal computers, televisions, SmartPhones, and printers, the OUI data would be too general and ambiguous. Furthermore, information needs to be gathered from data such as a "User-Agent" field or string via the Hypertext Transfer Protocol (HTTP), for example. When a software agent operates in accordance with a network protocol, it often identifies itself, its application type, operating system, software vendor, or software revision, by submitting a characteristic identification string to its operating peer. In HTTP, the Session Initiation Protocol (SIP) and other protocols, this identification is contained in a header field called User-Agent. In HTTP, the User-Agent string is often used for content negotiation, where the origin server selects suitable content or operating parameters for the response.

As with many other HTTP request headers, the information in the User-Agent string contributes to the information that the client sends to the server, since the string can vary considerably from user to user. Also, the User-Agent string may involve interpretation and a new release of an operating system means there would be devices that the system has no prior knowledge of in order to find a match against a database.

DESCRIPTION OF EXAMPLE EMBODIMENTS

Overview

In one embodiment, a dynamic endpoint profiling system and method are provided. A server is in communication with a network device that has network connectivity to one or more endpoint devices. The server receives from the network device a packet that includes a Media Access Control (MAC) address of an endpoint device. The server extracts from the packet one or more attributes that carry further descriptive information of the endpoint device, and determines based on the MAC address and the one or more attributes whether the endpoint device can be classified at a level of granularity according to a policy rule. If the endpoint device cannot be classified at the level of granularity, a probe function is dynamically selected based on the one or more attributes extracted from the packet and the MAC address to collect additional data about the endpoint device. One or more additional attributes are obtained from operation of a selected probe function. The operations of determining whether the endpoint device can be classified, dynamically selecting and obtaining are repeated until the endpoint device can be classified at the level of granularity, if possible.

Example Embodiments

Presented herein are techniques to perform highly accurate endpoint profiling, but in a dynamically controlled manner so as to conserve processing and network resources. These techniques overcome the aforementioned and other challenges. One challenge is that a determinative attribute for a particular endpoint device may vary. For example, for a printer of a particular manufacturer, the information is conveyed in the dhcp-class-identifier of the Dynamic Host Configuration Protocol (DHCP) or in the sysDesc attribute of the Simple Network Management Protocol (SNMP), whereas for other devices of that same manufacturer, the User-Agent field would convey if it is a Windows® phone, Android® phone, or a Galaxy® tablet, for example. This requires collecting data from multiple probe sources.

Profiler probes (also called probe functions) are software functions that can run on a server or on a network device to gather attributes of a network device from various protocols. Examples of such protocols are the Cisco Discovery Protocol (CDP) (a proprietary Data Link Layer protocol developed by Cisco Systems, Inc.), Link Layer Discovery Protocol (LLDP), SNMP, and Network Mapper (NMAP). These protocols are configured statically, meaning the probes are active at all times to collect information using the protocols. Such mechanisms can create unnecessary load on the probe functions running on the network device and/or the server because the probe functions do not necessarily add value once the most specific device type has been determined. For example, a probe function that gathers all attributes and sends all data to the server in an accounting packet creates unnecessary load because the data does not necessary add value once the most specific device type has been determined.

There are additional challenges in classifying new devices that are emerging in Internet of Things (IoT) applications, ultimately to ensure there are minimum/zero unknown endpoint devices in a network.

Figure 1:
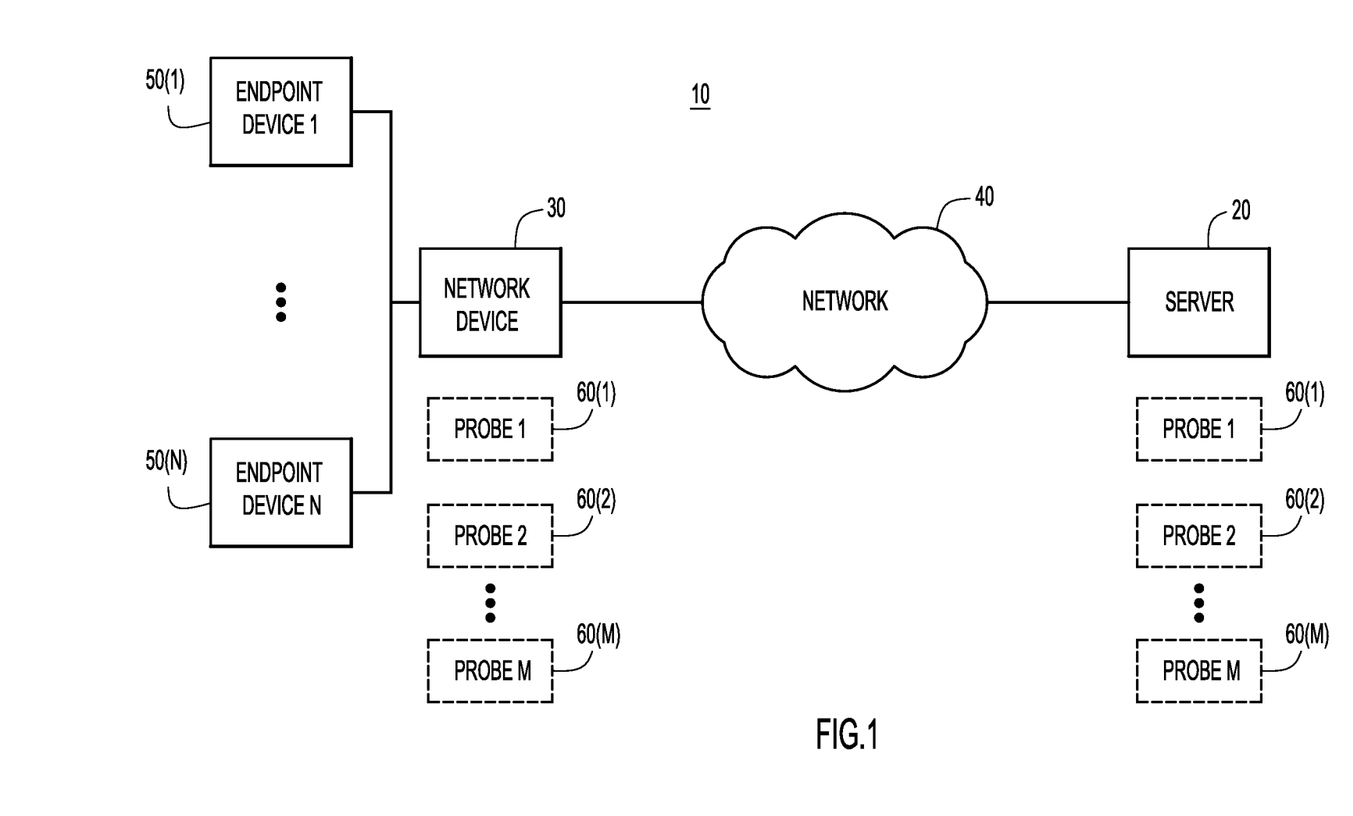
FIG. 1 is a block diagram of a system configured for dynamic endpoint profiling, according to an example embodiment.

With reference first made to FIG. 1, a system 10 is shown that includes a server 20, a network device 30 and a network 40. The network device 30 may be a switch, a gateway, a router, a wireless (e.g., Wi-Fi®) network device with wired switching capabilities, etc. The network device 30 can communicate with a plurality of endpoint devices 50(1)-50(N). It should be understood that the server 20 may communicate with a plurality of network devices, each of which in turn can communicate with a plurality of endpoint devices. For simplicity, a single network device 30 is shown.

As shown in FIG. 1, there a plurality of probe functions 60(1)-60(M). These probe functions may run on the server 20 and/or on the network device 30. The server 20 runs an analytical engine to perform the profiling of endpoint devices 50(1)-50(N) that connect to the network device 30. The techniques presented herein involve profiling operations on the network device 30 and/or server 20, control messages between the server 20 and the network device 30, and the data collection flow between these entities.

Depending on the probes used and the information that they are able to glean, a device may be determined down to its generic manufacture based on its MAC OUI, or down to the most specific device type. For example, without Hypertext Transfer Protocol (HTTP) traffic, an Apple iPhone® device is most likely determined as an Apple Device. On the other hand, for a Cisco device, the most effective probe would probably be CDP.

In current endpoint profiling schemes, a probe is a system wide configuration and not specific to a particular endpoint. Presented herein is an endpoint profiling system and method that dynamically tailors the probes used to add another probe when an existing probe is not sufficient, and scales down an existing probe that does not yield additional useful information. Once a determination is made of the profile of an endpoint (to the level of granularity desired), data collection from the endpoint is suspended/terminated.

In existing endpoint profiling techniques, for each endpoint whose information has been gathered periodically from the packet, the network device sends an accounting packet with the calling-station-id indicating the MAC address of the endpoint, and lists of attributes collected. The server returns to the network device an accounting response to acknowledge the receipt with no attributes in the payload. The accounting response may contain zero or more attributes per RFC 2866.

In accordance with the endpoint profiling system and method presented herein, the Remote Authentication Dial-In User Service (RADIUS) protocol may be used as the transport for the server 20 to deliver the profiling control messages to the network device 30. It is envisioned that other control protocols may be used, such as pxGrid of Cisco Systems, Inc., or the Source-Group Tag Exchange Protocol (SXP) to deliver the profiling probe control messages.

Using the RADIUS accounting response as illustration in this case, the server 20 may return in the accounting response, an instruction for the network device 30 to perform next level of scanning as follows:

cisco-avpair:SensorNextStep=Hold. When the server 20 has not been able to obtain a profile to the most specific type, and is still processing the information it has, the network device may continue with the correct sets of probes.

cisco-avpair:SensorNextStep=ActivateProbe:HTTP; DeativateProbe:CDP. The server 20 has determined that CDP does not yield useful information and needs to collect User-Agent information with HTTP. The network device 30 stops gleaning CDP information from that endpoint (e.g., one of the endpoint devices 50(1)-50(N)) and collects an HTTP packet instead.

cisco-avpair:SensorNextStep=DeactivateAllProbes. When the server 20 has determined the most specific device type, information does not need to be gleaned by the network device from the endpoint.

The determination as to which probe function to activate to profile an endpoint may be made by server 20. The server 20 includes a profiling inference engine that dynamically activates a specific probe function, and deactivates all probes for a given endpoint once the device type of the endpoint is determined to the most specific value, such as Apple Device: Apple iDevice:Apple iPhone6.

Dynamic Profiling

Figure 2:
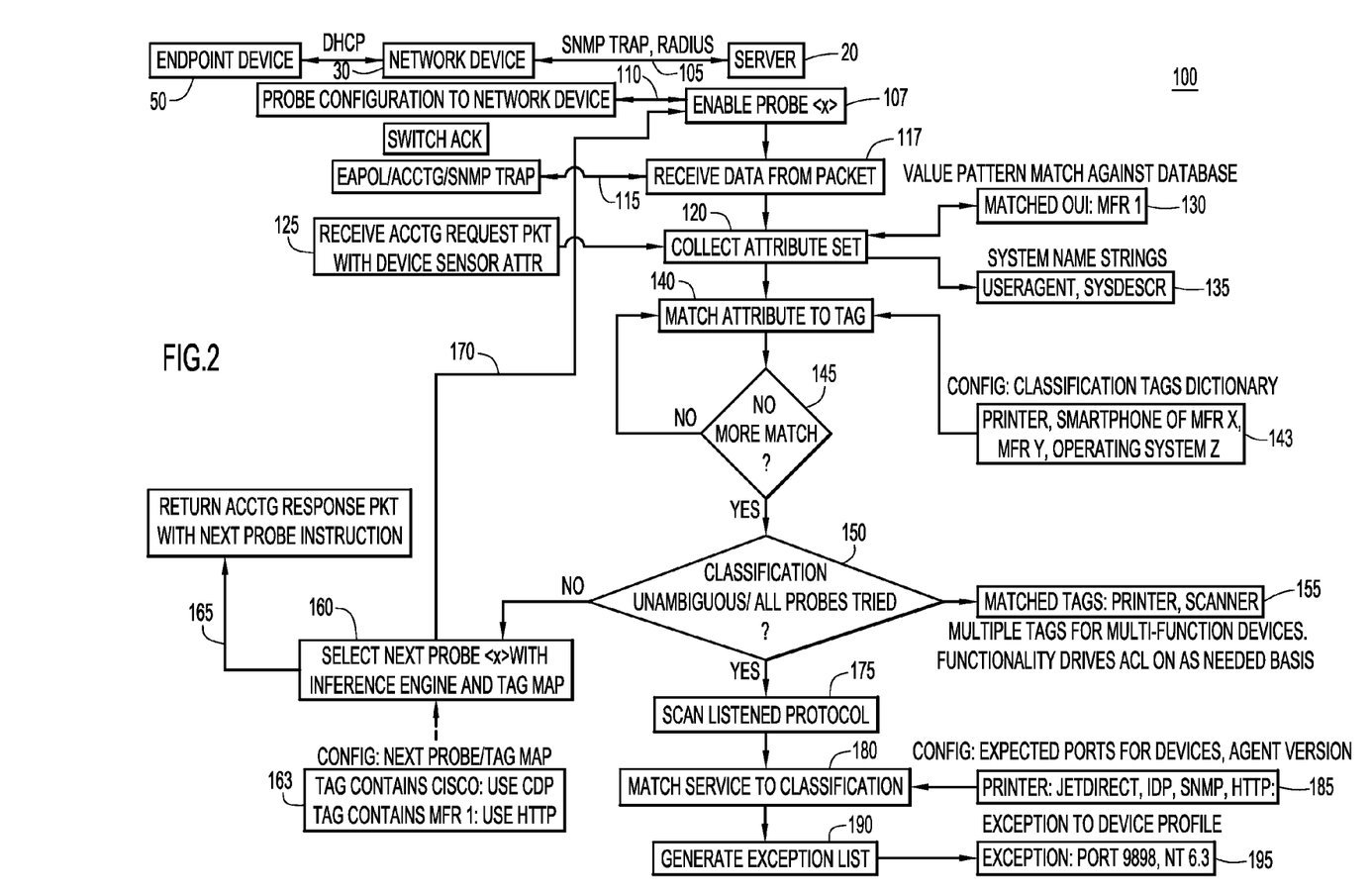
FIG. 2 is a flow chart illustrating operations of a dynamic endpoint profiling process, according to an example embodiment.

Reference is now made to FIG. 2, with continued reference to FIG. 1. FIG. 2 illustrates control and data flow 100 between the server 20 and the network device 30. In describing the flow 100, an endpoint device identified by reference numeral 50 is shown in FIG. 2, and is representative of any of the endpoint devices 50(1)-50(N) shown in FIG. 1.

At 105, endpoint profiling flow starts with collecting the MAC address of the endpoint device 50 as it connects to the network. This may be done with one of several mechanisms. The server 20 may enable a RADIUS probe to collect calling-station-id/MAC address from the network device 30, or an SNMP probe to receive an SNMP trap when the device connects to the switch's wired/wireless interface.

The server enables a selected probe, denoted Probe<x> at 107 and at 110, the server 20 sends a RADIUS request to the network device 30 to download and deliver to the network device 30 any network device side configuration to work with the selected probe function to be enabled. This includes enabling RADIUS accounting, or an SNMP sensor probe function on the network device. Instead of a RADIUS request, the aforementioned pxGrid or SXP protocols may be used to communicate to the network device 30.

At 115, when the endpoint device 50 connects to the network device 30, the network device 30 generates and sends to the server 20 a packet that conveys the MAC address of the endpoint device 50. The network device 30 could send an SNMP trap to convey the MAC address on the interface when the endpoint device 50 connects to it. The network device 30 could also send the MAC address in a calling-station-id attribute when the device authenticates using IEEE 802.1x/MAB over Extensible Authentication Protocol (EAP) over LAN (EAPOL-RADIUS). In the case of an "open" network, the network device 30 could still send the MAC address information to the server 20 over a RADIUS accounting request as shown at step 125 or an SNMP trap. At 117, after a probe function Probe <x> is enabled at 107 and the packet obtained at 115 is received at the server 20, the server extracts data from this packet. At 120, the server 20 extracts the attribute set from the data contained in this packet received from the network device 30.

At 130, the server 20 searches a database containing an IEEE OUI list for a match on the manufacturer of the endpoint device 50 based on the OUI portion of the MAC address of the endpoint device 50. For example, the OUI portion may match to a device made by Manufacturer 1 (Mfr 1). At 135, the server 20 also extracts from the packet system name strings, such as the User-Agent, dhcp-class-identifier, hostname and SysDescr attributes as they usually carry descriptive information of the endpoint device 50.

Next at 140, if there is an OUI match, there is no further work other than checking the IEEE OUI list. But with other attributes obtained at 135, such as User-Agent, the string is split and matched against tags from a (configurable) dictionary to capture keywords, such as Printer, SmartPhone of Mfr X, Mfr Y, Operating System Z, etc., as shown at 143.

As shown at 145, the attribute matching process continues until no more tags are matched on the phrase.

At 150, it is determined whether the profiling yields an unambiguous classification at the granular level according to one or more policy rules maintained by the server 20. If so, further probing is terminated. A device may match to multiple classifications, for example, both Scanner and Printer, as shown at 155.

If the endpoint device cannot be classified unambiguously with the probe functions attempted up to that point, at 160, the next probe function to use to collect data about the endpoint device is selected using an inference engine. A server policy and visibility preference rule may be defined to match a device at a coarse level of a particular manufacturer (e.g., Mfr 1), or at a fine granularity of SmartPhone of Mfr 1. The result yielded by the OUI portion of a MAC address is usually considered to be ambiguous because multiple types of devices made by the same manufacturer will have the same OUI portion in their MAC address. In addition, if all probes have been attempted, further probing also stops.

In selecting a next probe to use (Select Next Probe<x>) at 160, an inference engine and tag map (obtained at 140 and 143) are used to determine the next probe to use. The inference engine is described in detail below. As shown at 163, a configurable tag map dictionary may be used to select the appropriate protocol for a particular type of endpoint device, which protocol may be proprietary to a manufacturer of that endpoint device. For example, CDP probes may be used for devices made by Cisco Systems, Inc., for example. The configurable tag map dictionary 163 includes entries that identify, when a particular endpoint device manufacturer is determined, to use a particular protocol to communicate with and probe that endpoint device for more detailed information about that endpoint device.

At 165, the server 20 sends a RADIUS accounting response packet indicating the next probe to enable on the network device 30.

In addition to operation 165 when the server 20 sends a packet/message indicating the next probe to enable on the network device 30, at 170, the server collects the next round of data of the endpoint device from the network device 30 as collected by the activated probe, and operations 120-150 are repeated with that data.

If, at 150, an unambiguous classification is reached, or the inference engine has exhausted its loop limit, the iteration to profile the endpoint device stops. At this point, a device is either inferred or failed to converge with conflicting data. At 175, a port scan is initiated next to check for current services and any exception to the inference. This is to capture a further specialized device that has a special port enabled, such as a point of sale (POS) or medical device, as well as new version of an operating system. For example, an endpoint device with an operating system version string that has a version after the last version in the configuration is likely a device similar to a particular operating system but with a newer version of that operating system. This endpoint device is flagged for review and approval that the identified exception/difference rule will be incorporated programmatically into the configuration to recognize it as a particular version of a particular operating system, e.g., Windows® 10, for instance.

At 180, the protocol scan is matched against the current device classification. For example, "jetdirect" is matched to Printer. Other examples are shown at 185 in FIG. 2.

At 190, the protocols that are in exception or conflicting to the current device classification are listed in an exception list, as shown at 195. This allows, for example, a Windows PC or an iPad® device that is used to run a POS function to be flagged so that a custom rule can be used to assign these device types in the dictionary. This may be as simple as the administrator reviewing and assigning a name to the specialized device that maps to the custom rule already assembled.

Inference Engine

Figure 3:
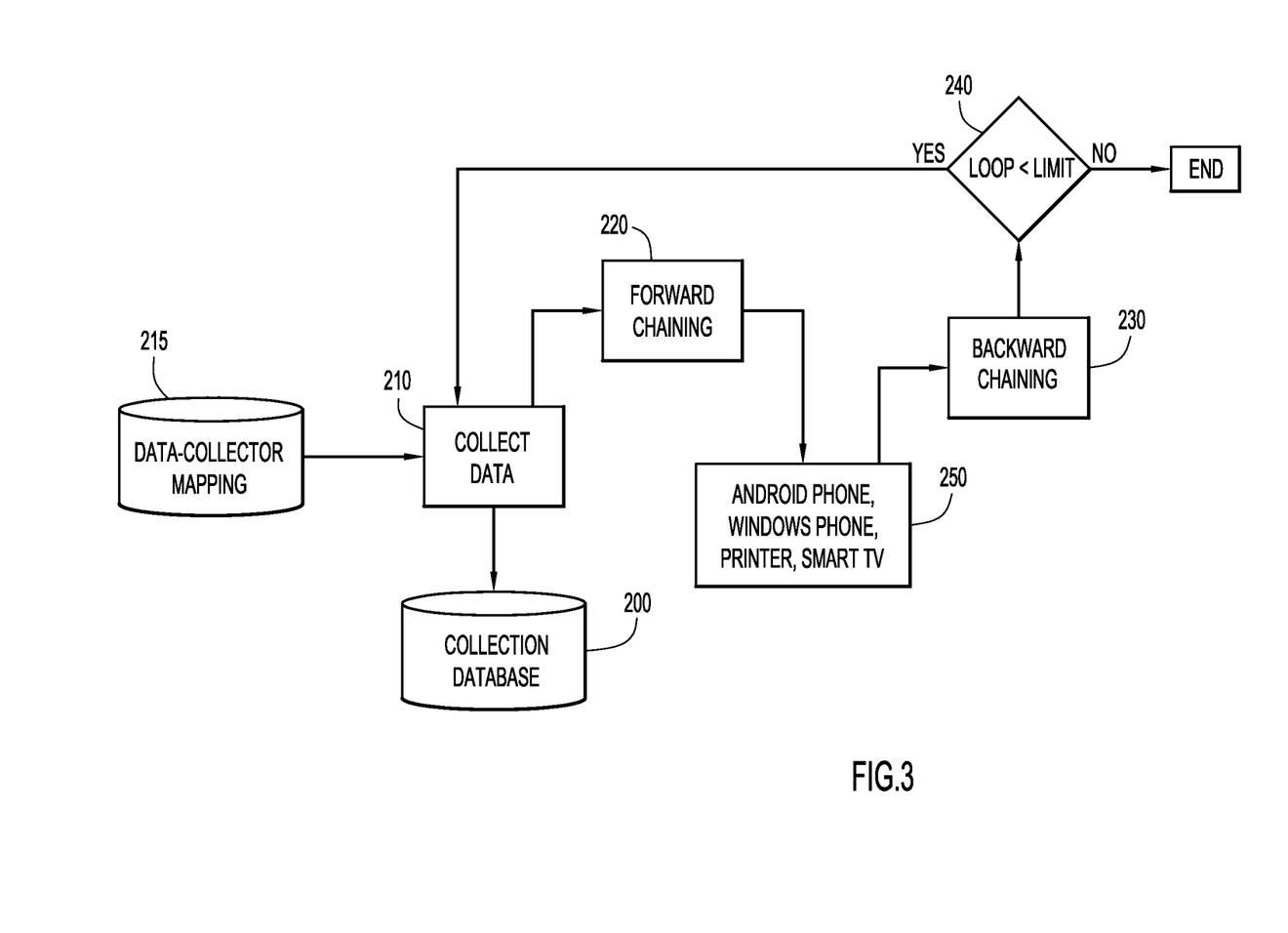
FIG. 3 is a flow chart illustrating operations of an inference engine as part of the dynamic endpoint profiling process depicted in FIG. 2, according to an example embodiment.

Reference is now made to FIG. 3 for a more detailed description of the operations of the inference engine referred to at step 160 in FIG. 2. The inference engine uses a combination of forward chaining and backward chaining analysis to determine the endpoint device type and to determine what additional data to collect next (i.e., what probe function to use next), until a determination can be made.

For purposes of the description of the inference engine logic flow, a collection database is shown at reference numeral 200. The collection database 200 stores data collected by probe functions, as depicted by the collect data function 210. The data-collector mapping function 215 is a static key-value mapping of "to learn the value of attribute X, what is the probe that would be used to collect attribute X." For example, to learn the value of User-Agent attribute, an HTTP probe will be used; to learn the value of dhcp-class-identifier, a DHCP probe will be used; to learn the value of SysDesc, an SNMP probe will be used. It is with this mapping <Attribute A2: acquire with Probe P2> that the condition is tested: "If A2=Value V2 then device is D3" by activating P2 to collect A2.

The main functions of the inference engine include a forwarding chaining function 220, a backward chaining function 230 and a loop limit function 240. The inference engine logic flow starts with forward chaining reasoning applied by the forward chaining function 220 using an antecedent "if rule" to collect data to infer the possible device type consequent. The backward chaining function 230 then applies backward chaining reasoning and starts with the possible consequent to collect additional data to determine if it supports the current consequent. If there is no consequent match, the current consequent is checked off and removed from further consideration. Next, the process reverts to the collect data function 210 and iterates on the remaining antecedents for a possible consequent. It then proceeds back to the forward chaining function 220 to collect data in order to infer the possible consequent from the data collected. Based on the inference consequent at each iteration, the inference engine dynamically identifies additional specific data to collect and probe functions to enable in order to collect that data. The iterations continue until a match is found, or until no new data is uncovered or the iteration reaches a configured limit. Examples of possible matches determined during operation of the inference engine are shown at reference numeral 250.

The inference engine may operate as follows. A base probe function P1 is used to collect AttributeA1=Value V1, where Attribute A1 is the OUI of a MAC address. A probe function may capture multiple attributes, but A1 is used as an example to start.

From Probe P1 learning attribute value A1=V1, the inference engine infers a short list of candidate attributes. To determine which candidate attribute matches to the device type, the inference engine looks at a rule database to determine which attribute A2=V2 would resolve the ambiguity for the device. Starting with a candidate attribute, a probe function P2 is selected that would collect the disambiguation attribute A2. The process loops back again, and continues looping in this manner, until ultimately inferring a short list of a single candidate attribute. At that point the loop stops. If instead, Probe P2 did not yield A2=V2 but some other attribute A4=V3, another short list of candidates is inferred and the loop repeats. If Probe P2 yields A2=V2' that is similar to V2, it infers a "similar candidate with minor exception." This "similar candidate with minor exception" helps bring the short list to conclusion even if there is no exact match. As noted, a loop limit is provided to prevent an infinite loop in the rare case that a single candidate cannot be converged. In other words, this loop of dynamically selecting a probe function continues until a probe function is selected that can capture a single candidate attribute that resolves any remaining ambiguities for the endpoint device.

The following is a further example of the operations of the inference engine. Forward chaining is performed, starting with an antecedent to collect the OUI portion of a MAC address (e.g., gleaned from an Address Resolution Protocol request) to infer possible consequents. If the OUI is Mfr 1, and Mfr 1 makes printers, televisions, SmartPhones of operating system X and SmartPhones of operating system Y, then the endpoint device could be any of these devices. Backward chaining is performed as follows:
  a. If the endpoint device is a SmartPhone of Operating System X, then http User-Agent contains "Operating System X".
  b. If the endpoint device is a SmartPhone of Operating System Y, then http User-Agent contains "Operating System Y".
  c. If the endpoint device is a television, then http User-Agent contains "Television" or some other indicator of a television.
  d. If the endpoint device is a printer, then dhcp-class-identifier contains "Network Printer".

Backward chaining starts with a possible consequent to collect data to determine if the data supports the current consequent. If no consequent match occurs, current consequents are checked off, and antecedents are iterated on for remaining possible consequents.

Forward chaining is again performed, starting with an antecedent to collect dhcp-class-identifier attributes (e.g., gleaned from a DHCP request) to infer a possible consequent. If dhcp-class-identifier attributes contain "Network Printer" then the endpoint device is a Printer. The inference is that the endpoint device is a Printer of Mfr 1.

Figure 4:
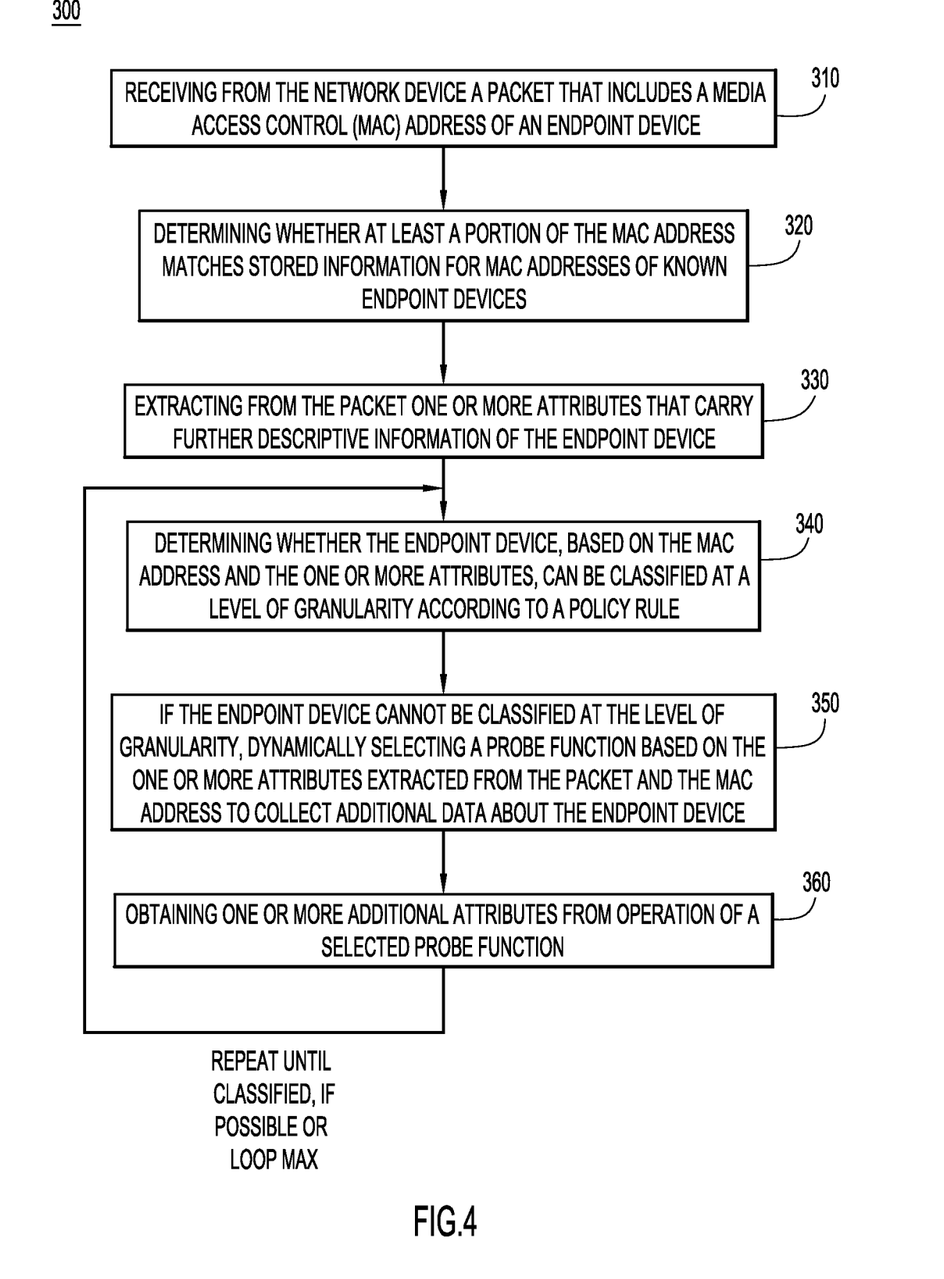
FIG. 4 is a high-level flow chart of a dynamic endpoint profiling process, according to an example embodiment.

FIG. 4 shows a high-level flow chart of a dynamic endpoint profiling process 300 according to embodiments presented herein. At 310, a network device receives a packet that includes a MAC address of an endpoint device. At 320, it is determined whether at least a portion of the MAC address matches stored information for MAC addresses of known endpoint devices. At 330, one or more attributes are extracted from the packet, which one or more attributes carry further descriptive information of the endpoint device. At 340, it is determined based on the MAC address and the one or more attributes whether the endpoint device can be classified at a level of granularity according to a policy rule. At 350, if the endpoint device cannot be classified at the level of granularity, a probe function is dynamically selected based on the one or more attributes extracted from the packet and the MAC address to collect additional data about the endpoint device. The selection of a probe function may be made according to the operations of the inference engine described above. At 360, one or more additional attributes are obtained from operation of a selected probe function (selected at 350). A loop consisting of steps 340-360 repeats until the endpoint device is classified at the level of granularity according to the policy rule or until a maximum number of iterations occurs. Thus, in one embodiment, one or more additional attributes are obtained (at operation 360) when the endpoint device cannot be classified at the level of granularity.

When the probe function selection is made at a server, the server sends to the network device a message indicating a selected probe function to use for the endpoint device, and receiving from the network device data collected by the network device based on the selected probe function. The message may contain configuration information for the selected probe function. As explained above in connection with FIG. 3, the dynamically selecting operation of step 350 may involve applying forward and backward inference analysis based on attributes collected on the endpoint device and remaining ambiguities to be resolved for the endpoint device. The loop of steps 340-360 depicted in FIG. 4 is repeated until a probe function is selected that can capture a single candidate attribute that resolves the remaining ambiguities for the endpoint device.

As explained above, the determining operation 320 may include determining if there is a match of the one or more attributes in the packet with stored information containing tags associated with particular types of endpoint devices. Further still, the method 300 may further include analyzing the one or more attributes which indicate that the endpoint device is using a new version of a particular operating system, and storing information indicating a configuration to recognize the new version of the particular operating system.

Figure 5:
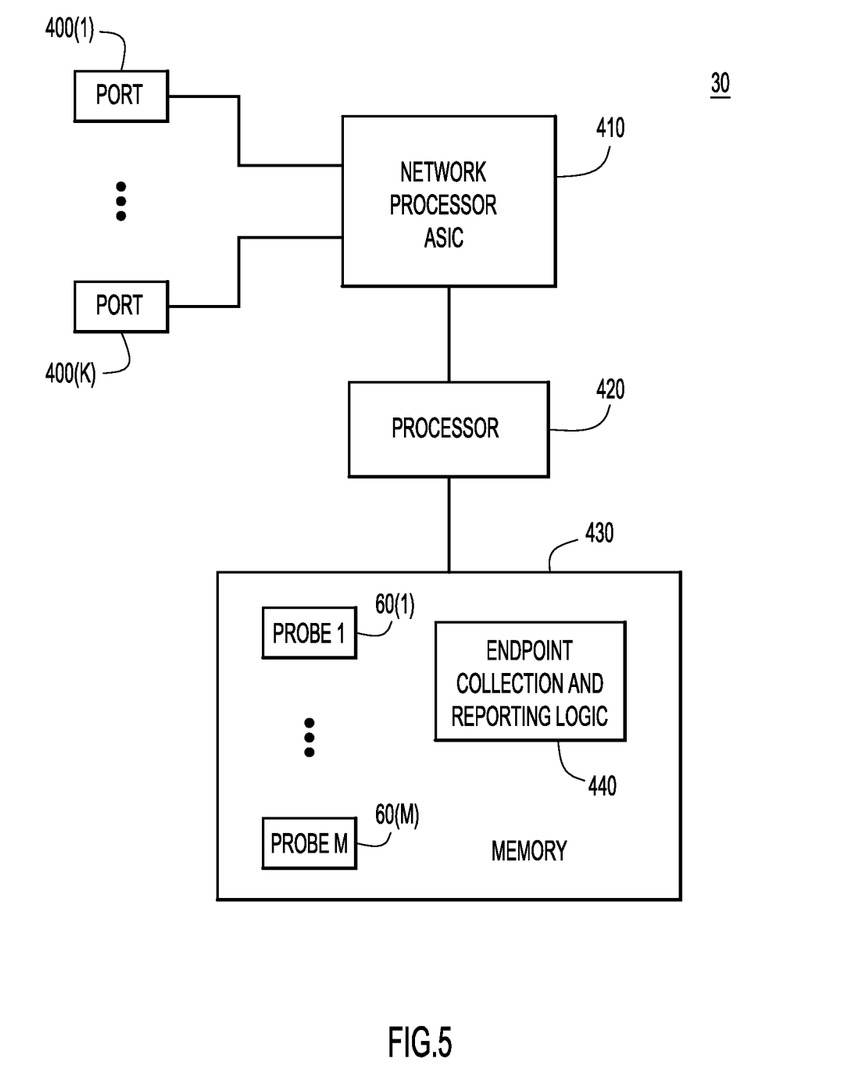
FIG. 5 is a block diagram of a network device configured to participate in the dynamic endpoint profiling process, according to an example embodiment.

Reference is now made to FIG. 5. FIG. 5 shows a block diagram of network device 30, in accordance with an example embodiment. The network device 30 may be a network switch, gateway device, wireless network device (e.g., a Wi-Fi router or switch), router, etc. To this end, the network device 30 includes a plurality of ports 400(1)-400(K), a network processor application specific integrated circuit (ASIC) 410 (or multiple such ASICs), a processor 420 and memory 430. The network processor ASIC 410 is configured to perform packet switching or routing functions and includes a switching fabric and related logic to perform those functions. If the network device 30 is a wireless network device, then the network device 30 would further include one or more antennas, a radio transceiver for transmitting and receiving wireless signals, and a modem or baseband signal processor to perform baseband signal processing. The modem functions may be included as part of one or more ASICs.

The processor 420 is a microprocessor or microcontroller (or multiple instances thereof) configured to execute instructions stored in memory, including software instructions for each of the probe functions 60(1)-60(M) and instructions for endpoint collection and reporting logic 440. As explained above, the network device 30 may be controlled by the server 20 to activate a particular probe function when an endpoint device connected to the network device 30 is to be profiled. The endpoint collection and reporting logic 440 causes the network device 30 to collect data obtained from execution of a probe function and to send that data to the server 30 for analysis.

The memory 430 may include read only memory (ROM), random access memory (RAM), magnetic disk storage media devices, optical storage media devices, flash memory devices, electrical, optical, or other physical/tangible memory storage devices. Thus, in general, the memory 430 may comprise one or more tangible (non-transitory) computer readable storage media (e.g., a memory device) encoded with software comprising computer executable instructions and when the software is executed (by the processor 420) it is operable to perform the operations described herein.

Figure 6:
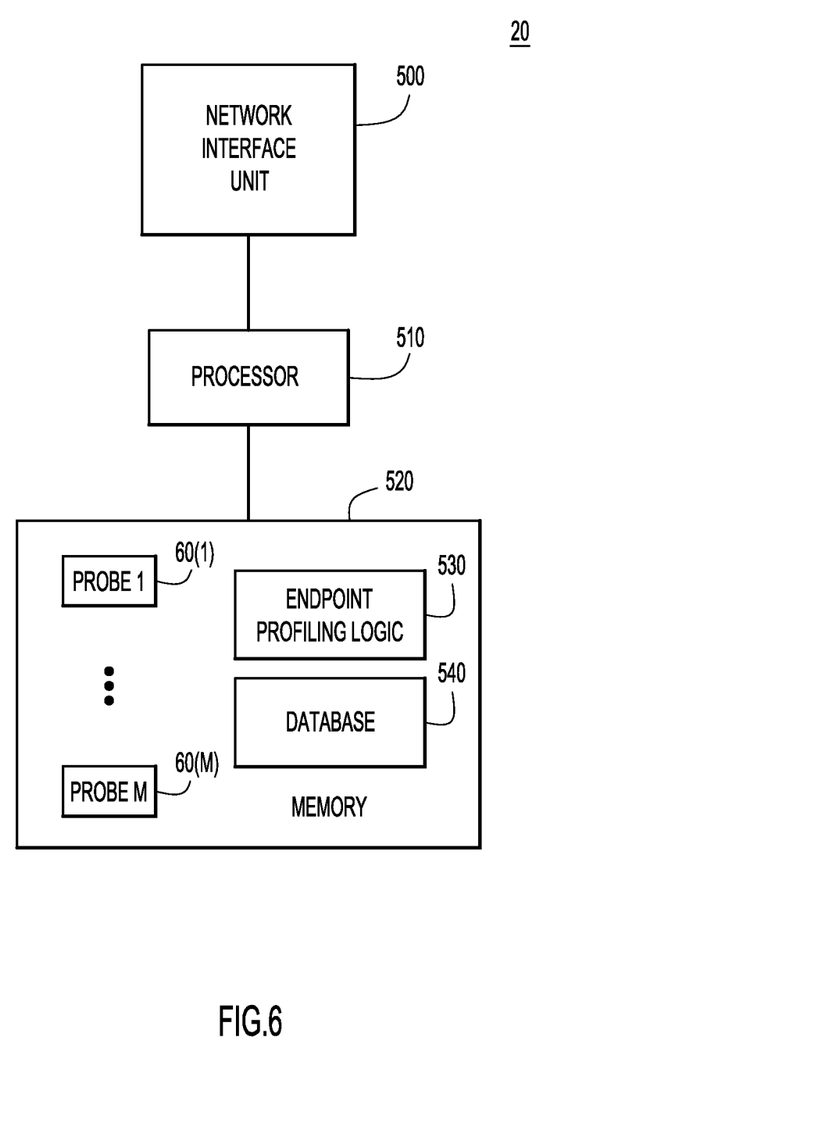
FIG. 6 is a block diagram of a server configured to participate in the dynamic endpoint profiling process, according to an example embodiment.

Reference is now made to FIG. 6. FIG. 6 shows a block diagram of the server 20 in accordance with an example embodiment. The server 20 includes a network interface unit 500, a processor 510 (or multiple processors) and memory 520. The network interface unit 500 is a network interface card (NIC), for example, that enables network communication so that the server 20 can communicate with the network device 30. The processor 510 is a microprocessor or microcontroller. The memory 520 may take on any of the forms referred to in connection with FIG. 5. The memory 520 stores instructions for the probe functions 60(1)-60(M), instructions for endpoint profiling logic 530 and a database 540. In one form, the network device 20 may include the capabilities of the probe functions 60(1)-60(M) instead of that functionality residing on the network device 30. The endpoint profiling logic 530 enables the server 20 to perform the operations described herein in connection with FIGS. 1-4. The database 540 stores the data collected by one or more probe functions and used by the endpoint profiling logic 530 in determining the profile an endpoint device. The server 20 may be embodied by one or more software programs running in a datacenter/cloud computing system.

To summarize, presented herein are a system and methods that dynamically orchestrate network services to collect specific data in order to classify and profile endpoint devices on the network. In one form, the method uses a combination of forward and backward inference, using matched data to fine tune the next collection protocol to be used. Ambiguous results and remaining possibilities are used to determine the next data to collect on the endpoint device. Heuristics may be employed to classify and match an unknown device to a closest known model.

State of the art endpoint profiling methods gather attributes from various protocols that are configured statically, meaning the probes are active at all times to collect information using the protocol. Such methods create unnecessary load on a network device and a server because the probes do not necessary add value once the most specific device type has been determined. With the state of art, unless the probes are configured, data are not collected and the resulting device classification could be ambiguous. No attempt is made to elaborate from the base knowledge by collecting data with a different protocol. This method presented herein dynamically activates and deactivates specific data collection probes based on what has been learned and what are the remaining ambiguities are to be resolved. Only useful data is collected and the data collection is suspended once the device type determination is made.

Using the method presented herein, unknown devices can be classified to a closest known model and new match rules are generated based on a difference from the last known closest model. This helps scale device endpoint profiling in the IoT era where ongoing new device models and operating systems versions come to market and connect to the network. It is otherwise difficult for any device database to keep up-to-date.

To summarize, a method is provided comprising, at a server in communication with a network device that has network connectivity to one or more endpoint devices: receiving from the network device a packet that includes a Media Access Control (MAC) address of an endpoint device; determining whether at least a portion of the MAC address matches stored information for MAC addresses of known endpoint devices; extracting from the packet one or more attributes that carry further descriptive information of the endpoint device; determining based on the MAC address and the one or more attributes whether the endpoint device can be classified at a level of granularity according to a policy rule; if the endpoint device cannot be classified at the level of granularity, dynamically selecting a probe function based on the one or more attributes extracted from the packet and the MAC address to collect additional data about the endpoint device; obtaining one or more additional attributes from operation of a selected probe function from the dynamically selecting; and repeating the determining whether the endpoint device can be classified, the dynamically selecting and the obtaining until the endpoint device can be classified at the level of granularity, if possible.

In another form, an apparatus is provided comprising: a network interface unit configured to enable communications over a network, including communication with a network device that has network connectivity to one or more endpoint devices; and a processor coupled to the network interface unit and configured to: receive from the network device a packet that includes a Media Access Control (MAC) address of an endpoint device; determine whether at least a portion of the MAC address matches stored information for MAC addresses of known endpoint devices; extract from the packet one or more attributes that carry further descriptive information of the endpoint device; determine based on the MAC address and the one or more attributes whether the endpoint device can be classified at a level of granularity according to a policy rule; if the endpoint device cannot be classified at the level of granularity, dynamically select a probe function based on the one or more attributes extracted from the packet and the MAC address to collect additional data about the endpoint device; obtain one or more additional attributes from operation of a selected probe function; and repeat the operations to determine whether the endpoint device can be classified, dynamically select a probe function and obtain the one or more additional attributes until the endpoint device can be classified at the level of granularity, if possible.

In another form, a system is provided comprising: a network device that has network connectivity to one or more endpoint devices; and a server in communication with the network device, wherein the server is configured to: receive from the network device a packet that includes a Media Access Control (MAC) address of an endpoint device; determine whether at least a portion of the MAC address matches stored information for MAC addresses of known endpoint devices; extract from the packet one or more attributes that carry further descriptive information of the endpoint device; determine based on the MAC address and the one or more attributes whether the endpoint device can be classified at a level of granularity according to a policy rule; if the endpoint device cannot be classified at the level of granularity, dynamically select a probe function based on the one or more attributes extracted from the packet and the MAC address to collect additional data about the endpoint device; obtain one or more additional attributes from operation of a selected probe function; and repeat the operations to determine whether the endpoint device can be classified, dynamically select a probe function and obtain the one or more additional attributes until the endpoint device can be classified at the level of granularity, if possible.

In still another form, one or more non-transitory computer readable storage media are provided encoded with instructions that, when executed by a processor, cause the processor to: receive from the network device a packet that includes a Media Access Control (MAC) address of an endpoint device; determine whether at least a portion of the MAC address matches stored information for MAC addresses of known endpoint devices; extract from the packet one or more attributes that carry further descriptive information of the endpoint device; determine based on the MAC address and the one or more attributes whether the endpoint device can be classified at a level of granularity according to a policy rule; if the endpoint device cannot be classified at the level of granularity, dynamically select a probe function based on the one or more attributes extracted from the packet and the MAC address to collect additional data about the endpoint device; obtain one or more additional attributes from operation of a selected probe function; and repeat the operations to determine whether the endpoint device can be classified, dynamically select a probe function and obtain the one or more additional attributes until the endpoint device can be classified at the level of granularity, if possible.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a server in communication with a network device that has network connectivity to one or more endpoint devices:
receiving from the network device a packet that includes a Media Access Control (MAC) address of an endpoint device;
determining whether at least a portion of the MAC address matches stored information for MAC addresses of known endpoint devices;
extracting from the packet one or more attributes that carry further descriptive information of the endpoint device;
determining based on the MAC address and the one or more attributes whether the endpoint device can be classified at a level of granularity according to a policy rule;
if the endpoint device cannot be classified at the level of granularity, dynamically selecting a probe function based on the one or more attributes extracted from the packet and the MAC address to collect additional data about the endpoint device;
obtaining one or more additional attributes from operation of a selected probe function from the dynamically selecting; and
repeating the determining whether the endpoint device can be classified, the dynamically selecting and the obtaining until the endpoint device can be classified at the level of granularity, if possible.

2. The method of claim 1, further comprising sending to the network device a message indicating the selected probe function to use for the endpoint device, and receiving from the network device data collected by the network device based on the selected probe function.

3. The method of claim 1, further comprising sending to the network device a message containing configuration information for the selected probe function.

4. The method of claim 1, wherein the dynamically selecting comprises applying forward and backward inference analysis based on attributes collected on the endpoint device and any remaining ambiguity to be resolved for the endpoint device.

5. The method of claim 4, wherein the repeating is performed until a probe function is selected that can capture a single candidate attribute that resolves any remaining ambiguity for the endpoint device.

6. The method of claim 1, wherein dynamically selecting includes selecting a probe function that uses a particular communication protocol for communicating with the endpoint device based on the one or more attributes obtained for the endpoint device.

7. The method of claim 1, wherein the particular communication protocol is proprietary to a manufacturer of the endpoint device.

8. The method of claim 1, wherein determining further includes determining if there is a match of the one or more attributes in the packet and stored information containing tags associated with particular types of endpoint devices.

9. The method of claim 1, further comprising:
analyzing the one or more attributes which indicate that the endpoint device is using a new version of a particular operating system; and
storing information indicating a configuration to recognize the new version of the particular operating system.

10. An apparatus comprising:
a network interface unit configured to enable communications over a network, including communication with a network device that has network connectivity to one or more endpoint devices; and
a processor coupled to the network interface unit and configured to:
receive from the network device a packet that includes a Media Access Control (MAC) address of an endpoint device;
determine whether at least a portion of the MAC address matches stored information for MAC addresses of known endpoint devices;
extract from the packet one or more attributes that carry further descriptive information of the endpoint device;
determine based on the MAC address and the one or more attributes whether the endpoint device can be classified at a level of granularity according to a policy rule;
if the endpoint device cannot be classified at the level of granularity, dynamically select a probe function based on the one or more attributes extracted from the packet and the MAC address to collect additional data about the endpoint device;
obtain one or more additional attributes from operation of a selected probe function; and
repeat the operations to determine whether the endpoint device can be classified, dynamically select a probe function and obtain the one or more additional attributes until the endpoint device can be classified at the level of granularity, if possible.

11. The apparatus of claim 10, wherein the processor is configured to dynamically select the probe function by applying forward and backward inference analysis based on attributes collected on the endpoint device and any remaining ambiguity to be resolved for the endpoint device.

12. The apparatus of claim 11, wherein the processor is configured to repeat until a probe function is selected that can capture a single candidate attribute that resolves any remaining ambiguity for the endpoint device.

13. The apparatus of claim 10, wherein the processor is configured to dynamically select a probe function that uses a particular communication protocol for communicating with the endpoint device based on one or more attributes obtained for the endpoint device.

14. The apparatus of claim 10, wherein the processor is configured to determine if there is a match of the one or more attributes in the packet and stored information containing tags associated with particular types of endpoint devices.

15. The apparatus of claim 10, wherein the processor is configured to:
analyze the one or more attributes which indicate that the endpoint device is using a new version of a particular operating system; and
store information indicating a configuration to recognize the new version of the particular operating system.

16. A system comprising:
a network device that has network connectivity to one or more endpoint devices; and
a server in communication with the network device, wherein the server is configured to:
receive from the network device a packet that includes a Media Access Control (MAC) address of an endpoint device;
determine whether at least a portion of the MAC address matches stored information for MAC addresses of known endpoint devices;
extract from the packet one or more attributes that carry further descriptive information of the endpoint device;
determine based on the MAC address and the one or more attributes whether the endpoint device can be classified at a level of granularity according to a policy rule;
if the endpoint device cannot be classified at the level of granularity, dynamically select a probe function based on the one or more attributes extracted from the packet and the MAC address to collect additional data about the endpoint device;
obtain one or more additional attributes from operation of a selected probe function; and
repeat the operations to determine whether the endpoint device can be classified, dynamically select a probe function and obtain the one or more additional attributes until the endpoint device can be classified at the level of granularity, if possible.

17. The system of claim 16, wherein the server is configured to configured dynamically select the probe function by applying forward and backward inference analysis based on attributes collected on the endpoint device and any remaining ambiguity to be resolved for the endpoint device.

18. The system of claim 17, wherein the server is configured to repeat until a probe function is selected that can capture a single candidate attribute that resolves any remaining ambiguity for the endpoint device.

19. The system of claim 16, wherein the server is configured to select a probe function that uses a particular communication protocol for communicating with the endpoint device based on one or more attributes obtained for the endpoint device.

20. The system of claim 16, wherein the server is configured to determine if there is a match of the one or more attributes in the packet and stored information containing tags associated with particular types of endpoint devices.

* * * * *